United States Patent
Kubertschak (10) Patent No.: US 11,073,406 B2
(45) Date of Patent: Jul. 27, 2021

(54) UPDATING AN ELECTRONIC MAP (71) Applicant: AUDI AG, Ingolstadt (DE)

(72) Inventor: Tim Kubertschak, Ingolstadt (DE)

(73) Assignee: Audi AG, Ingolstadt (DE)

( * ) Notice: Subject to any disclaimer, the term of this patent is extended or adjusted under 35 U.S.C. 154(b) by 304 days.

(21) Appl. No.: 16/313,775

(22) PCT Filed: May 30, 2017

(86) PCT No.: PCT/EP2017/063051
§ 371 (c)(1),
(2) Date: Feb. 21, 2019

(87) PCT Pub. No.: WO2018/001670
PCT Pub. Date: Jan. 4, 2018

(65) Prior Publication Data
US 2020/0386572 A1 Dec. 10, 2020

(30) Foreign Application Priority Data
Jul. 1, 2016 (DE) .......................... 102016008175.9

(51) Int. Cl.
G01C 21/00 (2006.01)
G06K 9/00 (2006.01)
(Continued)

(52) U.S. Cl.
CPC ...... G01C 21/3811 (2020.08); G01C 21/3837 (2020.08); G06K 9/00818 (2013.01);
(Continued)

(58) Field of Classification Search
CPC ............ G01C 21/3811; G01C 21/3837; G01C 21/3602; G01C 21/32; G06K 9/00818;
(Continued)

(56) References Cited

U.S. PATENT DOCUMENTS 6,560,529 B1  5/2003  Janssen
8,284,995 B2 10/2012  Diaz et al.
(Continued)

FOREIGN PATENT DOCUMENTS

CN  102099656 A   6/2011
DE  19842176 A1   3/2000
(Continued)

OTHER PUBLICATIONS

International Search Report and Written Opinion of the International Search Authority directed to related International Patent Application No. PCT/EP2017/063051, dated Oct. 27, 2017, with attached English-language translation; 40 pages.
(Continued)

*Primary Examiner* — Thomas Ingram
(74) *Attorney, Agent, or Firm* — Sterne, Kessler, Goldstein & Fox P.L.L.C.

(57) ABSTRACT

The disclosure relates to a method for updating an electronic map. The method includes detecting at least one first object by means of a sensor device of a motor vehicle and assigning a position of the motor vehicle, detected by means of a position detecting device of the motor vehicle, to the detected first object. The method also includes generating a first object data set representing the detected first object and the position assigned to the first object, by means of an evaluation device of the motor vehicle. The method further includes deriving a second object data set, representing a second object external to the vehicle, which is different from the first object detected, from the first object data set. The method also includes updating the electronic map by adding map data corresponding to the second object data set to the map or by removing map data contradicting the second object data set from the map by means of a computing device to improve updating of the electronic map.

15 Claims, 2 Drawing Sheets

(51) Int. Cl.
    *G06K 9/62* (2006.01)
    *G08G 1/01* (2006.01)
    *G08G 1/0962* (2006.01)

(52) U.S. Cl.
    CPC ......... *G06K 9/6201* (2013.01); *G08G 1/0112* (2013.01); *G08G 1/0129* (2013.01); *G08G 1/09626* (2013.01)

(58) Field of Classification Search
    CPC .. G06K 9/6201; G08G 1/0112; G08G 1/0129; G08G 1/09626; G08G 1/0141; G08G 1/09623
    See application file for complete search history.

(56) References Cited

U.S. PATENT DOCUMENTS

| | | | |
|---|---|---|---|
| 9,677,895 | B2 | 6/2017 | Schulz |
| 9,733,085 | B2 | 8/2017 | Stählin et al. |
| 2015/0266471 | A1 | 9/2015 | Ferguson et al. |
| 2019/0384294 | A1* | 12/2019 | Shashua ............... G05D 1/0088 |

FOREIGN PATENT DOCUMENTS

| | | |
|---|---|---|
| DE | 10258470 A1 | 7/2004 |
| DE | 102009018073 A1 | 1/2010 |
| DE | 102009006471 A1 | 9/2010 |
| DE | 102012212740 A1 | 5/2014 |
| DE | 102012220158 A1 | 5/2014 |
| DE | 102013215499 A1 | 2/2015 |
| EP | 2327961 A2 | 6/2011 |
| FR | 2931230 A1 | 11/2009 |
| WO | WO 2008/005952 A2 | 1/2008 |

OTHER PUBLICATIONS

International Preliminary Report on Patentability directed to related International Patent Application No. PCT/EP2017/063051, dated Nov. 29, 2018, with attached English-language translation; 22 pages.

* cited by examiner

UPDATING AN ELECTRONIC MAP

TECHNICAL FIELD

The disclosure relates to a method for updating an electronic map, including detecting at least one first object by means of a sensor device of a motor vehicle, as well as assigning a position of the motor vehicle, detected by means of a position detecting device of the motor vehicle, to the detected first object, and generating a first object data set which represents the detected first object and the position assigned to the first object. The disclosure also relates to a system for updating an electronic map, having a fleet of motor vehicles and a central computing device external to the vehicles, the motor vehicles being configured to detect a position of the respective motor vehicle by a position detecting device of the respective motor vehicle and to detect at least one respective first object by a sensor device of the respective motor vehicle, in order to thereby assign the detected position to the respective first object, and to generate, by an evaluation device of the respective motor vehicle, a respective first object data set which represents the respective first object detected and the position assigned to the respective first object detected.

BACKGROUND

The high-precision electronic maps currently used for navigation or for highly or fully automatic driving are usually generated by driving special vehicles along routes. These vehicles are equipped with highly accurate and expensive measurement technology in order to precisely measure the respective road and update the map data of the electronic map, for example by adding new objects to the map or removing existing objects on the map, i.e. objects already represented on the map by map data. It is also necessary to store certain events detected by the vehicles on the map, such as the occurrence of traffic signs or areas with a traffic regulation, such as a speed limit, or to mark the corresponding areas where, for example, the speed limit is valid. Since every road has to be used in an explicit way, the data available are not very up-to-date. They are often between one and two years old. This time period can be reduced by a crowdsourcing approach, i.e. by using many different motor vehicles that do not necessarily have to be equipped with the expensive special hardware mentioned above. For example, roads can be included on a map if a certain number of vehicles have been or are driving on the road.

For example, FR 293 12 30 A1 reveals an automatic update system for map data of a motor vehicle, in which the navigation system of a vehicle determines from location data whether a road or a lane of a road is passable and automatically sends correction data to a server, which distributes the correction data if actual road or lane data deviates from the map data.

In this context, EP 2327961 A2 also discloses a method for generating an improved map for a vehicle navigation system in which an end user enters correction data and this data is transmitted to a server through which further map data can be updated.

WO 2008/005952 A2 also discloses a system for collecting correction requests for map data where a user-side manual correction of map data on a mobile device can be used to update map data on a server.

DE 10 2012 220 158 A1 describes a method for updating map data in which a corresponding position-related indication, for example an indication of a traffic sign specified by the motor vehicle, is transmitted from a motor vehicle at various positions to a central computing device. In this case, a corresponding, otherwise determined indication is checked on the basis of the received indication and a decision is made as to whether the received indication from the motor vehicle to an actually existing object, for example the corresponding traffic sign, can be inferred or not.

DETAILED DESCRIPTION

Therefore what is needed is a method and a system to improve the updating of an electronic map.

Embodiments of systems for updating an electronic map and methods for forming the same are described in the present disclosure.

The disclosure relates to a method for updating an electronic map with a series of steps. One step is the detection of at least one first object, for example a signpost, by means of a sensor device of a motor vehicle and the assignment of a position of the motor vehicle detected by means of a position detecting device of the motor vehicle to the first object detected. A position of the detected first object itself, for example the signpost itself, can also be calculated or generated from the data of the sensor device and the detected position, and this position can then be used instead of or in addition to the detected position of the motor vehicle, i.e. assigned to the first object. In the following, the position of the motor vehicle in particular can also be understood as the corresponding position of the first object. A further step is the creation of a first object data set, representing the first object detected and the position assigned to the first object, i.e. the position of the motor vehicle and/or the position of the object. This is done within the vehicle by means of an evaluation device of the motor vehicle.

A further step is deriving a second object data set from the first object data set representing a second object, which is different from the first object detected and is external to the vehicle. Thus, in the example of the signpost, the road on which the first object is positioned can be closed as the second object proximate to the position assigned to the first object. In this case, the second object data set can represent in particular a characteristic and/or a position of the second object. Thus, the standardized coloring of the signpost can for example be used to draw conclusions about the road class, i.e. the expansion stage of the road as a characteristic of the second object. For example, a distance specification on the signpost can also be used to draw a conclusion about the length of the road, and/or a location specification on the signpost can be used to draw an end point and/or a direction of the road. Deriving the second object data set can either be done internally by the evaluation device of the motor vehicle or externally, for example by a central computing device. Finally, a further step is updating the electronic map by modifying map data, e.g., adding map data corresponding to the second object data set to the map or by removing map data contradicting the second object data set from the map by means of a computing device, in particular the central computing device. The updated map can then be provided for use, in particular also to other users and/or motor vehicles.

This has the advantage that the update also takes into account roads that are rarely or not used. New landmarks, for example sights, gas stations and the like, which are not yet stored in the map, can also be integrated into the map. This is made possible by the fact that the respective interesting characteristics, infrastructure elements or objects external to the vehicle are not recorded or detected directly by the motor vehicle, but indirectly by infrastructure elements or other objects proximate to the vehicle, which can be monitored by sensor devices onboard the vehicle. The infrastructure elements and other objects, i.e. the first objects in the context of the disclosure, merely indicate the existence of the new roads or landmarks. In particular, second objects such as unknown roads which are not yet stored in the electronic map can be integrated into the electronic map. Otherwise such roads would not be used until autonomously driving vehicles are available at all locations, because they are not stored on the map and therefore unknown for an automatic route guidance. By evaluating the indirect information, the detection range of the sensor device of the respective motor vehicle is thus spatially extended beyond the actual physical detection range of the respective sensors.

The second object data set represents at least one characteristic of the second object which is inaccessible to detection or measurement by the motor vehicle or a further sensor device of the motor vehicle. For the above-mentioned signpost, the characteristic can for example be a distance from a location outside the sensor range of the motor vehicle, or also a presence of a road which is not used by the motor vehicle, and/or a road class of such a road which is not used. By deriving the second object data set, a virtual range of the sensors of the motor vehicle is achieved, which is greater than a physical range. Measurement variables that are difficult to access by direct measurements, such as a road class, are also made accessible to the motor vehicle. This increases the up-to-date status and relevance of the map data.

In some embodiments, it is provided that the computing device is a vehicle-external computing device and that the first and/or the second object data set is transmitted by the motor vehicle to the vehicle-external computing device before being updated. In particular, processing-related data can also be transmitted with the object data set. The processing-related data may include further data useful or necessary for processing the object data set or the object data sets in the vehicle-external computing device, in particular for checking for a match of useful or necessary data mentioned below. Processing-related data may include, for example, measurement uncertainties and/or probabilities of existence. Measurement uncertainties and/or probabilities of existence are required for detecting a match in the Bayesian network verification referred to below in order to obtain reliable results.

This has the advantage that any computationally-intensive updating of the electronic map, which requires the generation of map data corresponding to the second object data set, can be carried out not in the motor vehicle but by a computationally powerful central computing device, such as a backend server. Accordingly, the algorithms used can be updated and improved without great effort and a centrally stored electronic map can be updated. The object data sets from several different motor vehicles can also be taken into account or the updated map can be made available to several motor vehicles with little effort. This makes the system particularly attractive as the continuously updated map can be made available to the general public.

In some embodiments, detecting and generating is repeated. In particular, the transmission of the respective object data set is repeated. Detecting and generating (as well as, if necessary, transmitting) each relate once again to a position as well as a first object (as well as, if necessary, correspondingly a first and/or second object data set), namely by the one motor vehicle and/or a further motor vehicle. The detection and/or generation and/or transmission can in particular also relate to the above-mentioned and/or further processing-related data. The position can be the one and/or a further position. The first object can be the one and/or another first object. It can, for example, repeatedly drive a motor vehicle past a position with a same first object, for example the aforementioned signpost, and detect this and carry out the further method steps accordingly, or a vehicle can detect further positions with further first objects. However, another vehicle can also detect the first object already detected by the motor vehicle as well as the assigned position, for example the signpost at the same position, or other first objects with corresponding positions. In particular, the derivation of the second object data set is repeated here. One motor vehicle and/or the other motor vehicle can be a motor vehicle or vehicle fleet.

In some embodiments, a crowdsourcing approach is used for updating the electronic map, in which the strengths of the indirect approach described above are particularly advantageous. Thus, the map is derived taking into account a variety of indications, namely object data sets, of many different motor vehicles, so that less frequently used roads or traffic signs can also be evaluated and taken into account. The statistical properties of such large amounts of object data sets result in particularly high accuracy and fault tolerance. This means that the map is particularly up-to-date and that the map can be continuously updated. In addition, the costs for mapping are also reduced, since specifically equipped motor vehicles are no longer required for mapping, or at least a smaller number of those are needed, in order to keep the electronic map accessible and up-to-date for a large number of users.

Since the updated map is also made available to other motor vehicles through the central processing unit, the electronic map can also be further completed in a targeted manner by, for example, specifically taking an infrastructure element such as a newly added road into account in a route guidance, for example in the case of piloted driving, or recommending it in a route guidance, in order to be able to collect further, more precise data on the infrastructure element.

In some embodiments, it can be provided here that before the map is updated, the computing device checks the respective first and/or the respective second object data sets for a match in the respective first and/or in the respective second object data sets and the update only takes place if a match is detected. This means that before each update by the computing unit, either the different first or the different second object data sets are checked. The map is only updated if information from one checked first (or second) object data set matches information from the other checked first (or second) object data set. This has the advantage that a reliability and accuracy of the maps is increased, and that indications or map data are only transferred to the electronic map if they reach a certain reliability and are not, for example, caused by a one-time measurement or interpretation error.

It may be provided that a match is detected when two object data sets are checked, and in particular only if the object data sets refer to the same object external to the vehicle. For example, a match can be detected if two signposts, which are located at different locations and in doing so for example refer to a road or a landmark as a common object, are detected as object data sets with a match. Thus, a match can for example be detected for the object data sets of a first signpost at location A, which points the way to location B, and a second signpost at location B, which points the way to location A. A match can also be detected for two object data sets, which, for example, are generated or derived as the same object external to the vehicle when repeatedly passing a certain signpost. This has the advantage that a match can be checked in a relatively simple way and thus the quality, i.e. reliability and accuracy, of the map data is increased.

In some embodiments, it is provided that a neural network or a Bayesian network or other recognition methods from the field of artificial intelligence are used for recognizing the match during the verification. In particular, exclusion according to the laws of logic can also be used here. Probabilistic methods can also be used here, since a lot of the information, i.e. the object data sets, which are detected, generated or derived by the vehicles, are subject to statistical uncertainty. Especially neuronal or Bavarian networks are particularly suitable to filter out reliable information from a variety of object data sets and to update the map accordingly with a particularly high accuracy and up-to-date status.

In some embodiments, it can be provided that the map is only updated if during checking a match is detected for a given minimum number of object data sets and/or for object data sets of a given minimum number of different motor vehicles. This is statistically particularly favorable, so that the reliability of the map can be increased. By specifying the respective minimum number, a prescribed quality of the map can be achieved.

In some embodiments, it can be provided that the object data sets also represent a respective point of time of detection of the first object and that the map is only updated if a match is detected while checking for a predetermined minimum number of object data sets with points of time of detection in a predetermined time interval and/or for object data sets with points of time of detection in a predetermined time interval of a predetermined minimum number of different motor vehicles. This has the advantage that changes, such as new roads or new landmarks, can be detected particularly quickly in an environment and checked for their reliability. Thus, for example, the statistical significance and thus reliability of an object data set or of the information underlying the object data set can be checked in a better way and the map can be adapted to changes in a faster way.

In another embodiment, it is provided that the respective detecting and generating, in particular also the derivation and/or transmission, will take place automatically and, in particular, continuously. This has the advantage that the map is constantly updated, and no activity is required from the driver of the vehicle.

In an embodiment, it is provided that if a road sign implemented as a signpost and/or an indicative sign is detected as the first object, based thereon, the second object data set, as the second object external to the vehicle, represents a road and/or a landmark which has not yet been stored in the electronic map and, during the updating, the road and/or landmark which has not yet been stored is added to the electronic map as map data. Instead of the road and/or landmark, an infrastructure element can also be generally represented here and added to the map in the form of map data. If the first object data set represents an indicative sign and/or a signpost, the second object data set represents an infrastructure element such as a road and/or a landmark. In particular, the landmark can include a point of interest and/or a parking lot and/or a gas station. This has the advantage that new connections are quickly updated on the map and the map is particularly up-to-date. Moreover, even with intensive use of automatic route guidance, the shortest route to the destination can be selected at any time, which saves time and $CO_2$ emissions.

In some embodiments, it is provided that, if at least one other road user and/or a traffic sign such as a diversion sign is detected as the first object, based thereon, the second object data set as the second object external to the vehicle represents a local characteristic of a road which has not yet been stored in the electronic map, in particular a local traffic regulation such as a one-way road and/or a closed area, and/or a road class. In this case the previously not yet stored characteristic of the electronic map is added whilst updating as map data and, in particular, if required, a characteristic which contradicts the characteristic stored in the electronic map is removed. Thus, if the first object data set represents other road users, in particular other motor vehicles and/or a behavior of other road users, and/or a traffic sign, for example a diversion sign, the second object data set represents a local characteristic of a road.

Thus, for example, a repeated detecting of other road users driving on a road marked as a one-way street in the electronic map against the direction of travel of the one-way street can, with sufficient quality or statistical quality, lead to the fact that the corresponding road in the map is assigned again a trafficability in both directions as a characteristic and the previously stored trafficability exclusively in one direction is removed again. This has the advantage that traffic rules that have changed at short notice can be identified particularly well and entered on the map.

Especially when recognizing a diversion or a diversion sign as the first object, a construction site can be traced back. This is particularly advantageous if only one direction is diverted and the corresponding effect on traffic is otherwise difficult or impossible to detect.

In another embodiment, if a natural object, in particular dust, is detected as the first object, based thereon the second object data set as the second object external to the vehicle, represents a local characteristic of a road traveled by the motor vehicle. In this example, the first object data set has not yet been stored in the electronic map, in particular a driving surface or road surface, and when updating as map data, the previously not yet stored characteristic of the electronic map is added. In particular a characteristic, contradicting the characteristic stored in the electronic map is removed. The term "natural object" can be understood as the opposite of a man-made object, as a so-called "artifact." The sun and a corresponding position of the sun, for example, from which glare and danger can be derived as a local characteristic of a road, can serve as a natural object in this case. In general, particles such as dust or moisture, which hangs in the air in the form of fog, or other particles can also be detected. The natural objects can also be detected indirectly, for example by evaluating the cleaning instructions of the windscreens or the environmental sensors of the motor vehicle. For example, a dusty surface can be inferred if a laser scanner has to be cleaned, as this is usually the case when dust impairs the corresponding optics. Thus, if the first object data set represents a natural object, the second object data set represents a local characteristic of a road traveled by the vehicle detecting the first object data set. These local characteristics may include, for example, local weather.

In particular, the first object data set can also represent a parameter internal to the vehicle, for example an average speed and/or an average fuel consumption. In this case, the second object data set represents in particular an elevation of the road, which can be derived from the average fuel consumption and the corresponding speed, and/or a current traffic situation on the road, which can be derived from a speed of the motor vehicle. Thus, for example, a traffic jam and/or a speed limit can be represented as a local characteristic of the road being driven on by the second object data set. These dynamic local characteristics, which can change within a few hours or even minutes, are of particular interest to users of electronic maps.

The detected first objects can be especially objects external and/or internal to the vehicle or parameters, which depend on a second object external to the vehicle in a known way, but cannot be influenced by a driver of the motor vehicle. This is particularly advantageous when obtaining indirect information about an environment or an environment of the motor vehicle.

Here, the respective first object data set may include semantic information from a sign, in particular from a traffic sign and/or from an indicative sign and/or from a signpost, and/or motion information of other road users, in particular of other motor vehicles, and/or behavior information of a driver of the respective motor vehicle and/or performance information of a sensor of the sensor device.

In some embodiments, it is provided that, if during updating a not-yet-stored road or a not-yet-stored landmark and/or another infrastructure element is added to the electronic map as map data, i.e. in the form of map data, determining a position of the not-yet-stored road and/or the not-yet-stored landmark on the electronic map includes a logical exclusion of positions impossible for the road and/or the landmark according to the first and/or second object data set and/or a trilateration taking into account the position associated with the first object.

For example, it can be excluded that an infrastructure element such as a road and/or a landmark is located in a direction opposite to the direction of an assigned signpost. With logical exclusion, you can also access additional information about the environment of the first object. The additional information can be stored in the map or be detected by the vehicle. For example, it can be stored for the position of a signpost, depending on whether it is located at a junction and/or intersection or at an exit. Since signposts at exits often only specify the direction to be traveled and not a compass direction in which the infrastructure element is located, this information can influence the result of the logical exclusion.

This has the advantage that characteristics and/or positions of the infrastructure element, in particular of the road and/or the landmark, can be easily automatically derived, so that a good accuracy of the automatic map can be achieved without further steps.

The disclosure also relates to a system for updating an electronic map, with a fleet of motor vehicles and a central computing device external to the vehicle. In this case, the motor vehicles are configured to detect a position of the respective motor vehicle by means of a position detecting device of the respective motor vehicle and at least one respective first object by means of a sensor device of the respective motor vehicle, and in doing so to assign the respective detected position to the respective first object, and to generate a respective first object data set by means of an evaluation device of the motor vehicle, representing the first object data set and the respective detected first object and the position assigned to the respective first object.

The evaluation devices of the motor vehicles or a computing device external to the vehicle, for example a backend server, are configured to derive from the first object data set a second object data set which represents a second object external to the vehicle which is different from the first object detected. The motor vehicles are configured to transmit the first object data set and/or the second object data set to the computing device external to the vehicle. The computing device is adapted here to update the electronic map by adding map data corresponding to the second object data set to the map or by removing map data corresponding to the second object data set from the map.

Various embodiments in accordance with the present disclosure provide a system for updating an electronic map.

The respective sensor devices can include at least one environment sensor for the detection of a first object external to the vehicle. For example, the environment sensor may be configured to detect a sign, in particular an indicative sign and/or a signpost and/or a traffic sign, and/or another road user, preferably another motor vehicle. Alternatively, or in addition, the respective sensor devices may also include a vehicle sensor for detecting the driver of the motor vehicle and/or a parameter of the motor vehicle internal to the vehicle, in particular a speed and/or fuel consumption and/or soiling, for example soiling of a windscreen and/or soiling of a sensor of the sensor device.

The features and combinations of features mentioned above in the description, as well as the features and combinations of features mentioned below in the description of the figure and/or shown in the figures alone, may be used not only in the combination indicated but also in other combinations without deviating from the scope of the disclosure. Thus, implementations of the disclosure which are not explicitly shown and explained in the figures, but which result from and can be produced through separate combinations of features from the implementations explained, are also to be regarded as included and disclosed by the disclosure. Implementations and combinations of features are also to be regarded as disclosed, which thus do not exhibit all the features of an originally phrased claims. Furthermore, implementations and combinations of features which go beyond or deviate from the combinations of features set forth in the back references of the claims are to be regarded as disclosed, in particular by the implementations set forth above.

Figure 1:
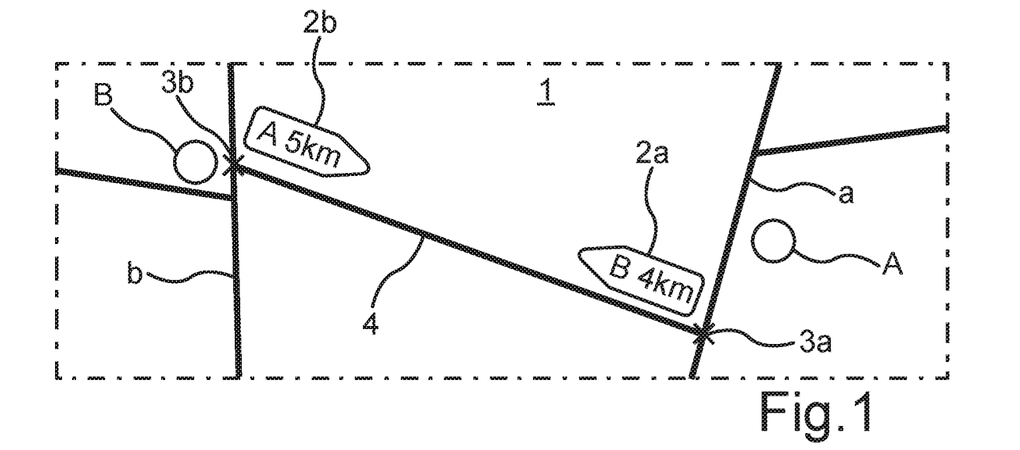
FIG. 1 is a first application example illustrating an exemplary embodiment of a method for updating an electronic map.
Figure 2:
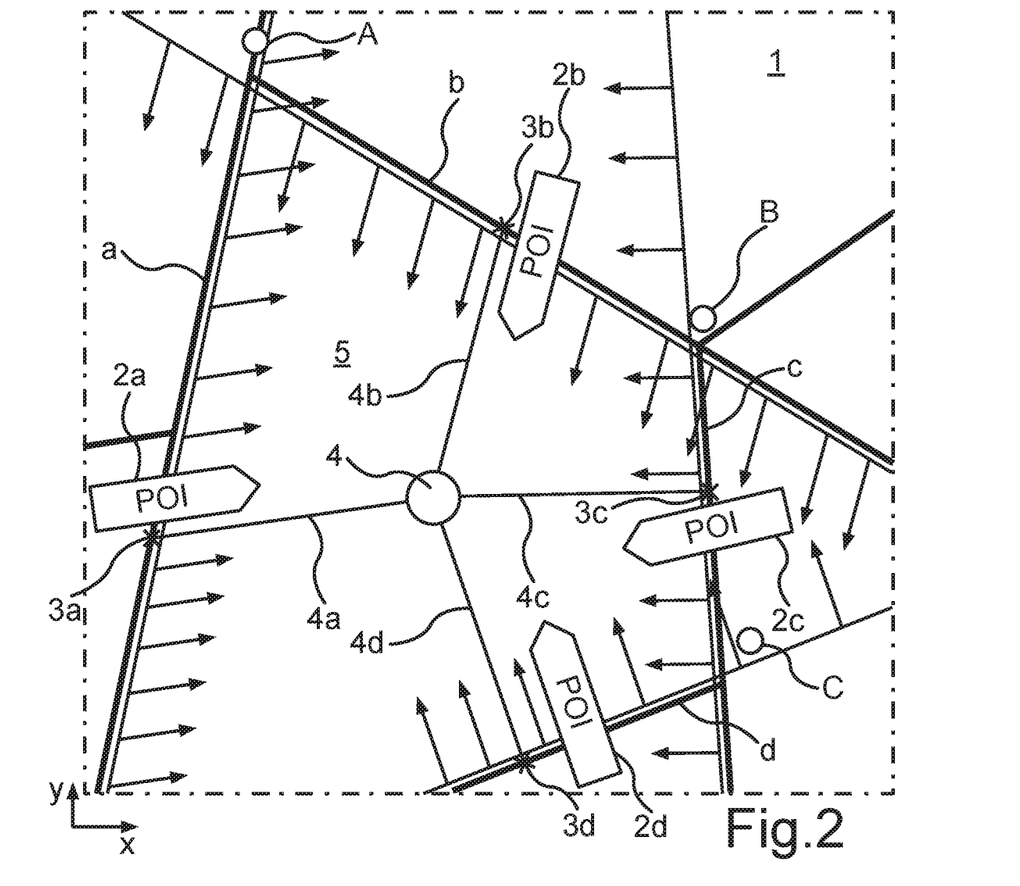
FIG. 2 is a second application example illustrating another exemplary embodiment of a method for updating an electronic map.
Figure 3:
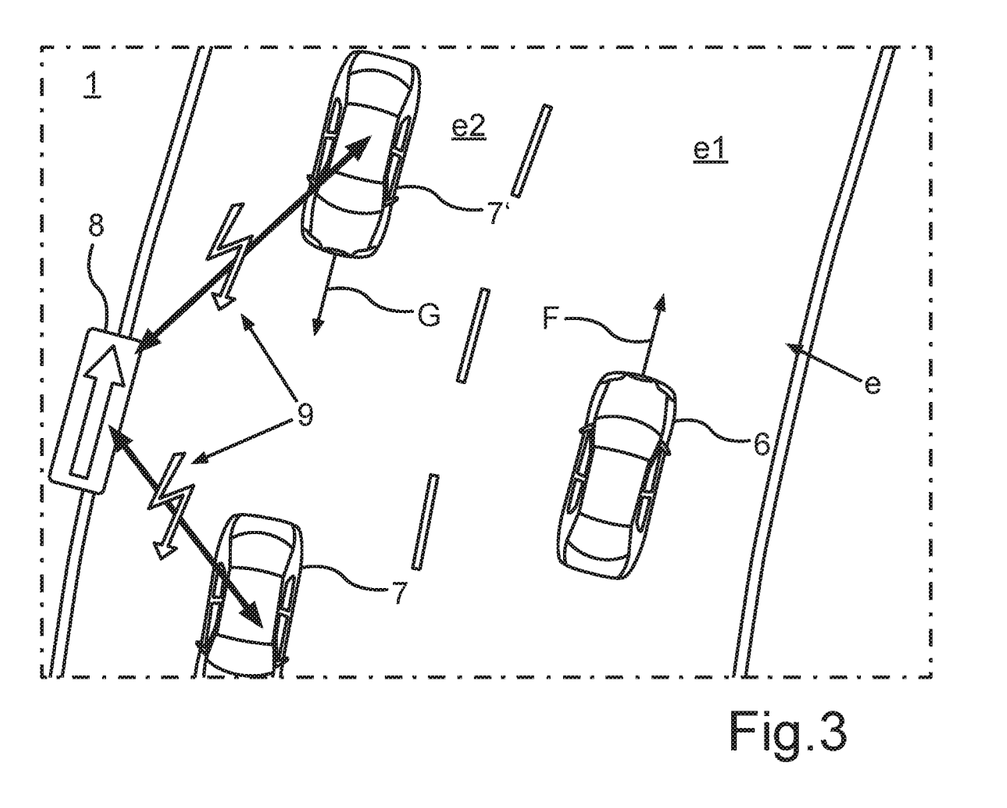
FIG. 3 is a third application example illustrating another exemplary embodiment of a method for updating an electronic map.

Exemplary embodiments of the disclosure are explained in more detail below using schematic drawings. The following applies:

FIG. 1 is a first application example illustrating an exemplary embodiment of a method for updating an electronic map;

FIG. 2 is a second application example illustrating another exemplary embodiment of a method for updating an electronic map; and FIG. 3 is a third application example illustrating another exemplary embodiment of a method for updating an electronic map.

Identical or functionally identical elements are provided with the same reference numerals.

FIG. 1 is shown as an application example of adding a new road to an electronic map. The electronic map 1 is shown here in simplified form as a principle representation. In the present case, a first object 2*a* was detected by a first motor vehicle as located at a position 3*a*. The first object 2*a* is in this case a sign implemented in the form of a signpost, which, for example, also includes a distance indication. In the present example, the detection may have taken place via a camera of the vehicle in the form of a sensor device. In the example shown, the detected position 3*a* of the motor vehicle on a road a is assigned to the first object 2*a* and a first object data set is generated accordingly.

A second object data set is then derived from the first object data set. This second object data set represents a second object 4 external to the vehicle, which is different from the first object 2*a*, in this case being the road. The second object data set can thus be derived from the first object data set that branches off at the assigned position 3*a* as the second object 4, in the present case being the road. On the side of the motor vehicle, this presupposes the possibility of understanding the first object 2*a* detected, here the signpost, as pointing to a road. In the example shown, road 4 is not yet stored in the electronic map 1.

In the present case, another first object 2*b* at another position 3*b* is detected by another motor vehicle on the other road b. As for the first object 2*a*, another first object data set is generated from the first object 2*b*, which is implemented as a signpost, wherein the first object data set represents the signpost as the detected first object 2*b* together with the assigned position 3*b*. In the present case, another second object data set is derived in the vehicle, which also represents the road not yet stored on the electronic map 1 as the second object 4. Deriving the respective second object data set can alternatively also take place after the respective transmission of the first object data sets to a central computing device external to the vehicle by means of the computing device.

In the example shown, the respective second object data sets are transmitted by the two motor vehicles to a central computing unit, where they are checked for matches in the present case.

In the example shown, the two corresponding second object data sets are compared. In one of the second object data sets, the second object 4 is a road with an approximate length of 4 kilometers that leads to a location B from position 3*a*. Conversely, in the other second object data set, the second object 4 leads as a road, and in this case with an approximate length of 5 kilometers, to location A. In the example shown, it is also evident from the coloring of the corresponding signs that the road class is identical.

Since the computing unit now has more information than the two motor vehicles which detect the respective first objects 2*a*, 2*b*, an internal logic, which for example is realized by a neural network, can recognize a match in the second object data sets. In the example shown, it is recognized that the second object data sets of the two motor vehicles both refer to the same second object 4 in the form of a road between positions 3*a* and 3*b* and that the second object 4 is added to map 1 accordingly in the form of map data.

Finally, the new, updated electronic map 1 is made available to the motor vehicles by the computing device, so that the second object 4 can in the future be taken into account by a driver assistance device of the respective motor vehicles, for example a route guidance system, or in the case of partially or fully automated driving.

FIG. 2 shows a further application example of an embodiment for updating an electronic map. The present case involves adding a landmark, a so-called point-of-interest (POI), to map 1. In the example shown, similar to the method described above, various first objects 2*a*, 2*b*, 2*c*, 2*d* on different roads a, b, c, d at assigned and detected positions 3*a*, 3*b*, 3*c*, 3*d* were detected by one or more motor vehicles. In the example shown, there are also three locations A, B, C at or on these roads, which in the present case are, however, not used for the method. In the present case, the first objects 2*a*, 2*b*, 2*c*, 2*d* are implemented as indicative signs and include an indication to a second object 4, the corresponding landmark, outside the vehicle. This can be, for example, a place of interest, a resting area, a gas station or the like.

Since in the example shown the indicative signs are equipped with a respective arrow, i.e. a direction, the derived second object data set also includes a direction for the second object 4, the landmark, starting from a respective detected position 3*a*, 3*b*, 3*c*, 3*d*. For example, the indicative sign on the road a at position 3*a* has an arrow, i.e. a directional reference in the positive x-direction. Accordingly, the next indicative sign 2*b* also has an indicative direction, in the present case in the negative y-direction. The first object 2*c* detected on road c in position 3*c* in the example shown has a direction indication in the negative x-direction. The first object 2*d* detected on the road d at position 3*d* is here a signpost to the landmark with a direction reference in the positive y-direction.

The central computing device, which has the mentioned information at its disposal in the form of the respective first and/or second object data sets, can now use the laws of logic to exclude that the second object 4, in the present case the landmark, is located in a negative x-direction when viewed from road a. The same applies to the other roads b, c, d, so that the calculating device can exclude that the second object 4 is outside the area delimited by the four roads a, b, c, d on the map 1. The central computing device can therefore draw the second object 4, in the present case the landmark, into a corresponding area 5 of the map 1. Since in this case the second object 4 is logically also connected by a road to the positions 3*a*, 3*b*, 3*c* and 3*d*, further second objects 4*a*, 4*b*, 4*c*, 4*d* can be drawn as a road connection between the respective positions 3*a*, 3*b*, 3*c*, 3*d* and the second object 4, in the present case the landmark.

If the detected first objects 2*a*, 2*b*, 2*c*, 2*d*, in the present case the indicative signs, additionally also include distance information, as is for example the case in the application example described above, the position of the second object 4 can be limited to a very small spatial area within the area 5 in a known way using a trilateration and the accuracy of the map 1 can be increased even further. In order to be able to interpret the direction information of the signposts correctly in the present case, further knowledge or further information may be required, for example whether positions 3*a*, 3*b*, 3*c* and 3*d* are an intersection or an exit, since signposts at exits often only specify a direction in which to travel in order to reach a corresponding location, but not the compass direction in which that location lies. For example, an underpass can be used to change direction in the opposite direction. If the corresponding information is not taken into account or not detected, this may result in a faulty map or a not updated status or only partially updated status of the map due to a lack of matches between the object data sets.

FIG. 3 illustrates a further application example of an exemplary embodiment of a method for updating an electronic map. In map 1 a road e is shown, which is driven by the own motor vehicle 6 on a first lane e1 in a driving direction F. In map 1, in the example shown, the road e is stored as a one-way street, which is symbolized by the one-way street sign 8 shown in the figure which does not represent a real one-way street sign here.

In the example shown, several motor vehicles 7 and 7' are detected by the own motor vehicle 6, which move on road e on a second lane e2 in a driving direction G opposite to the driving direction F of the own motor vehicle 6. This driving direction is in contradiction to the traffic regulation stored in map 1, in the present case the one-way street regulation. For illustrative purposes, the contradiction is symbolized by double arrows and flashes 9.

However, since the detecting of the other road users 7, 7' and their behavior, in this case driving in the opposite direction to direction F, is repeated, it can be concluded that the corresponding traffic regulation, here the one-way street regulation, is no longer up-to-date. After verifying this contradiction between the map data stored in map 1 with the characteristics of a one-way street stored for road e, as well as the behavior of the other motor vehicles 7 and 7' detected here as characteristics of the first objects, it can be concluded that the traffic regulation has been changed and is no longer valid for the present road currently used by the own motor vehicle 6.

Accordingly, the map data contradicting the detected behavior can be removed from the map 1 by the computing device and thus the electronic map 1 can be adapted to the currently valid traffic regulations. This is particularly advantageous for temporary adaptations, such as on construction sites, at festivities or on similar occasions.

The invention claimed is:

1. A method for updating an electronic map, comprising:
   detecting, by a sensor device of a motor vehicle, a first object, wherein
      the sensor device comprises a camera; and
      the first object comprises a direction indication and a distance indication for a second object, wherein the second object is external to the motor vehicle, and is different from the first object, and wherein the second object is a landmark; and
   assigning, to the first object, a position of the motor vehicle, wherein the position is detected by a position detecting device of the motor vehicle;
   generating, by an evaluation device of the motor vehicle, a first object data set, wherein the first object data set represents the first object and the position assigned to the first object;
   deriving, from the first object data set, a second object data set, wherein the second object data set represents the second object and at least one characteristic of the second object, and the at least one characteristic of the second object is not detected directly by the motor vehicle; and
   updating, using a computing device, the electronic map by removing map data contradicting the second object data set and adding map data corresponding to the second object data set, wherein the adding of the map data comprises:
      repeating the detecting, assigning and generating to provide multiple first object data sets associated with multiple first objects;
      adding the landmark, not yet stored to the electronic map; and
      determining a position of the landmark on the electronic map by trilateration using positions assigned to the multiple first objects, and direction indications and distance indications associated with the multiple first objects.

2. The method of claim 1, wherein the computing device is external to the motor vehicle, the method further comprising:
   prior to updating the electronic map, transmitting, by the motor vehicle, the first or the second object data set to the computing device.

3. The method of claim 1, wherein the detecting, assigning, generating and deriving are performed repeatedly to provide respective additional instances of the first object data set and the second object data set.

4. The method of claim 3, wherein the updating further comprises:
   checking within respective instances of the first object data set for a match of the first object prior to the updating.

5. The method of claim 3, wherein the updating further comprises:
   checking within respective instances of the second object data set for a match of the second object prior to the updating.

6. The method of claim 4, further comprising:
   using a neural network or a Bayesian network to recognize the match of the first object.

7. The method of claim 4, wherein the checking the respective instances of the first object data set includes checking for the match using a predetermined minimum number of respective first object data sets, or using other first object data sets received from a predetermined minimum number of different motor vehicles.

8. The method of claim 7, wherein the respective first object data sets include a representation of a respective point of time of detection of the first object, and the updating further includes checking for the match using the predetermined minimum number of the first object data sets with respective points of time of detection in a predetermined time interval, or using the other first object data sets with points of time of detection in a predetermined time interval of the predetermined minimum number of different motor vehicles.

9. The method of claim 1, wherein the detecting, assigning, generating and deriving are performed automatically and continuously.

10. The method of claim 1, wherein the determining the position of the landmark further comprises:
   logically excluding positions that are impossible for the landmark according to the first object data set and/or the second object data set.

11. A system for updating an electronic map, comprising:
   a motor vehicle comprising:
      a sensor device configured to detect a first object, wherein
         the sensor device comprises a camera; and
         the first object comprises a direction indication and a distance indication for a second object;
      a position sensing device configured to detect a position of the motor vehicle and to assign the detected position to the first object; and
      an evaluation device configured to generate a first object data set, wherein the first object data set represents the first object and the position assigned to the first object; and
   a computing device external to the motor vehicle, the computing device configured to update the electronic map by removing map data contradicting the second object data set and adding map data that corresponds to a second object data set.

12. The system of claim 11, wherein the evaluation device or the computing device is further configured to derive the second object data set from the first object data set, and wherein the second object data set represents a second object external to the motor vehicle, the second object being different from the first object.

13. The system of claim 11, wherein the motor vehicle is configured to transmit the first object data set and the second object data set to the computing device.

14. The system of claim 11, wherein the second object data set represents at least one characteristic of the second object that is not detected directly by the motor vehicle.

15. The system of claim 11, wherein the second object is a not-yet-stored landmark, and the computing device is further configured to:

determine a position of the landmark on the electronic map by using trilateration, taking into account positions assigned to multiple first objects, and direction indications and distance indications for the second object; and
 add the not-yet-stored landmark to the electronic map as map data.

\* \* \* \* \*